Nov. 13, 1951  G. A. LYON  2,574,491
WHEEL COVER
Filed March 9, 1948  2 SHEETS—SHEET 1
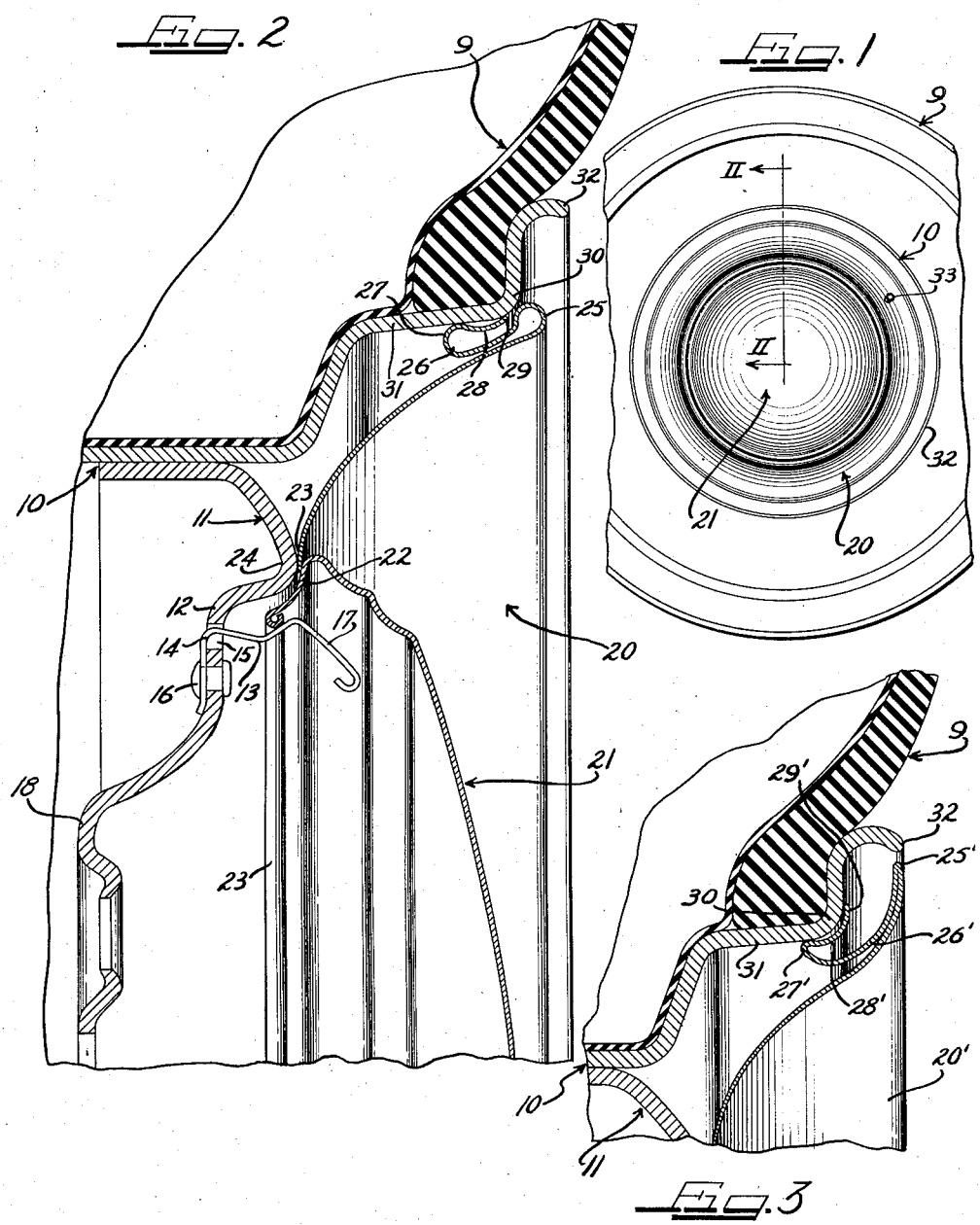
Inventor
GEORGE ALBERT LYON

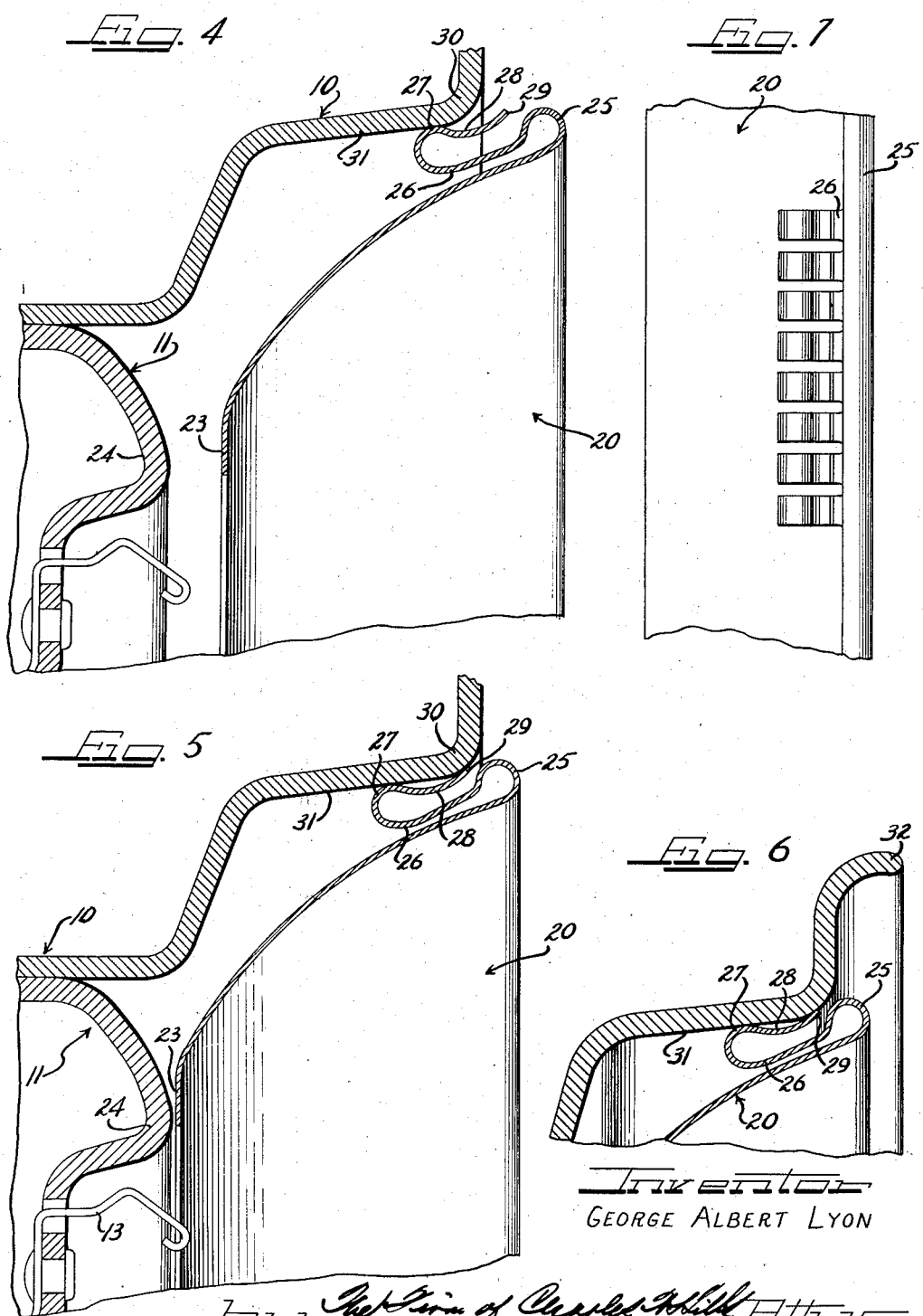

Patented Nov. 13, 1951

2,574,491

UNITED STATES PATENT OFFICE 2,574,491

WHEEL COVER

George Albert Lyon, Detroit, Mich.

Application March 9, 1948, Serial No. 13,749

8 Claims. (Cl. 301—37)

This invention relates to an ornamental wheel structure and more particularly to a circular ornamental member for covering the unsightly junction of the tire rim and body parts of a wheel.

An object of this invention is to provide an ornamental wheel cover with novel means for centering and cushioning the same on the wheel without the means permanently attaching the cover to the wheel.

Another object of this invention is to provide a trim ring with yieldable centering and cushioning means arranged so as to be compressed by the clamping of the ring to the wheel.

A still further object of this invention is to provide a circular ornamental wheel cover with cushioning means on its outer periphery which can be made from the four corners of a blank from which the cover is stamped.

In accordance with the general features of this invention there is provided in a wheel structure including a wheel having a multi-flanged tire rim part and a body part with the hub cap in detachable cooperation therewith, an annular trim ring disposed between the body part and trim part having its outer margin turned back on itself to form a hollow turned outer edge, the edge being spaced from the rim part and having extending rearwardly therefrom a plurality of loop-like yieldable fingers each with an outer extremity facing the rim part and engaging the flange thereof to form a cushioning centering contact between the ring and the rim part.

Another feature of the invention relates to the forcing of the inner edge of a trim ring of the aforesaid character against the body part of the wheel by the hub cap and the utilization of this pressing of the ring to tighten or compress further the fingers in engagement with the rim part.

Yet another feature of the invention relates to the provision of an ornamental circular cover member having its outer marginal portion turned back upon itself so as to provide the circular member with a reinforced outer edge having extending therefrom yieldable and compressible means for engaging the rim part of the wheel to center and cushion the member on the wheel.

Other objects and features of this invention will more fully appear from the following detailed description taken in conjunction with the accompanying drawings which illustrate several embodiments thereof and in which:

Figure 1 is a fragmentary side view of a wheel structure having an ornamental cover embracing the features of this invention;

Figure 2 is an enlarged, fragmentary, cross-sectional view taken on substantially line II—II of Figure 1 looking in the direction indicated by the arrows;

Figure 3 is a fragmentary cross-sectional view similar to Figure 2 showing a modification of the invention;

Figure 4 is a fragmentary cross-sectional view similar to Figure 2 showing the circular cover or trim member in the process of being applied to the wheel;

Figure 5 is a fragmentary cross-sectional view similar to Figure 4 but showing the trim ring in position after the cushioning means thereof has been compressed against the tire rim part but prior to the application of the clamping hub cap to the wheel;

Figure 6 is a fragmentary cross-sectional view similar to Figure 5 showing how the cushioning means on the cover or trim ring is further compressed after the cover has been engaged by the hub cap, as shown in Figure 2; and Figure 7 is a fragmentary rear view of the outer edge of the trim ring shown in Figure 2.

As shown on the drawings:

The reference character 9 designates generally a pneumatic tire and tube assembly of conventional construction mounted in the usual way upon a standard type of multi-flanged or drop center tire rim 10. This rim part 10 is mounted upon a conventional body part 11 which comprises a metallic stamping. It includes a dished or shouldered portion 12 on which the usual hub cap retaining spring clips 13 are mounted.

The clips 13 may be of any suitable number such, for example, as 3 to 5 and each includes a rear turned portion 14 extending through an opening 15 in the body part. The turned portion 14 is secured on the inboard side of a wheel by any suitable means such as a rivet 16.

The outer or free extremity of each clip is formed into a goose-neck or shoulder portion 17 which is engageable by the hub cap.

The center portion of the body part 11 is dished rearwardly to form a wheel bolt-on flange 18 for detachably fastening in the usual manner, by cap screws or bolts (as shown), to the brake drum assembly or other part of the wheel.

My invention is not concerned specifically with the construction of the wheel but rather with the provision of a novel circular cover member or trim ring designated generally by the reference character 20. This trim ring 20 may be made from any suitable sheet material, although I preferably contemplate stamping it from sheet steel. More specifically, the ring may be economically made from a square blank inasmuch as I can use the corners of the blank to form cushioning means for the trim ring which is discussed hereinafter.

The trim ring 20 is adapted to be detachably clamped or fastened to the wheel by a hub cap 21 having an underturned annular skirt 22 arranged to engage the inner edge or marginal portion 23 of the trim ring for pressing and clamping same against the nose portion 24 of the body part 11.

The underturned skirt 22 of the hub cap terminates in a turned edge 23 adapted to be cammed over the humped free extremities 17 of the clips 13 for tightly holding the hub cap on the wheel. The hub cap is easily detachable by inserting a pry-off tool under its outer edge and forcibly ejecting it from engagement with the spring clips. The spring clip structure shown is now known in the wheel art as having an "easy-on, hard-off" action in the application and removal of the cap.

The radially outer margin of the trim ring of cover member 20 is turned back rearwardly upon itself to form a hollow outer bear-like edge 25. This edge reinforces the outer periphery of the trim ring and provides an area for engagement by a pry-off tool, such as a screw driver, when it is desired to remove the trim ring from the wheel.

Now when the trim ring is made from a square blank, I find it economical to use the four corners of the blank in the formation of the four groups of cushioning fingers 26. One group of these cushioning fingers is shown in Figure 7.

Now referring more particularly to Figures 4, 5, 6 and 7 it will be perceived that the fingers 26 extend axially rearwardly from the rolled or curled edge 25 along but spaced from the back side of the trim ring 20. The end portion of each finger is turned back upon itself forming a U-shape bend 27 which leads into a slightly dished area 28 extending to the extremity 29 of the finger.

This arrangement is such that when the trim ring 20 is pressed toward the wheel, as shown in Figure 4, the first part of the cushioning spring to engage an inclined intermediate flange 31 of the rim part 10 is the U-portion 27 of the clip. This results in the clip being yieldably pressed slightly toward the back of the ring 20 as it is cammed along the inclined flange of the tire rim part. Further rearward movement of the trim ring causes the portion 27 to move further into the wheel until the extremity 29 engages the nose portion 30 at juncture of the inclined tire rim intermediate flange 31 with the inclined terminal flange of the tire rim part. Thus, when the cushioning finger 26 is in the position shown in Figure 5, is is yieldably and frictionally engaged under compression with the inclined flange 31 at two points. It is, of course, understood that each spring finger is identical and that all operate in the same manner.

Now when the cushioning finger 26 first engages the flange 31 in the application of the trim ring to the wheel, the trim ring is immediately centered on the wheel. Further inward axial movement of the trim ring to the position shown in Figure 5 results in the trim ring having a tight cushioned but readily detachable engagement with tire rim flange 31. However, when the trim ring is in the position shown in Figure 5, its inner margin or edge 23 is still slightly spaced from the nose portion 24 of the wheel body 11.

In order to fasten or clamp the trim ring 20 to the wheel, the hub cap is placed over the spring clips 13 and is pressed axially home to the position shown in Figure 2. In this act of mounting the hub cap 21 on the wheel the skirt 22 of the hub cap engages the edge 23 and yieldably presses the edge tightly against the nose portion 24 of the wheel body. In the course of this action the trim ring 20 is further tensioned which results in a still further tightening or compressing of the spring fingers 26 from the condition shown in Figure 5 to that shown in Figure 6. In other words, the spring fingers are further flexed out so that they are more nearly parallel to the rear side of the trim ring.

In this manner the cover is very tightly clamped under tension to the wheel and in a perfectly centered condition.

It is a distinct advantage in not having the trim ring 20 made of such cross-sectional contour that it simultaneously engages both the rim part 10 and the body part 11 when it is mounted on the wheel as shown in Figure 5. This advantage comes from the fact that in the manufacture of wheels considerable manufacturing tolerance is allowed as between the relative axial displacement of the nose portion 24 of the body part with reference to the nose portion 30 of the rim part. The relative locations of these two nose portions may vary for as much as ⅛ of an inch. Hence, it is not very feasible to have a metal trim ring tightly fit all wheels unless allowance is made for this manufacturing tolerance.

It is evident from Figure 5 that by having the outer portion of the trim ring first engage the rim part with the inner portion 23 out of engagement with the body part, the hub cap can thereafter be utilized to tightly stress and clamp the portion 23 against the body part of the wheel.

Attention is also directed to the fact that in this form of the invention the outer edge 25 of the trim ring does not extend clear up to the outer terminal flange edge 32 of the rim part 10. It is contemplated, however, as shown in the modification of Figure 3, that the outer edge of the trim ring could extend up to the edge 32. It should be noted that in Figure 3 the tired wheel is the same as the wheel shown in Figure 2 and hence the same reference numerals are used to designate parts common to these two figures.

In this modification of the invention the trim ring 20' has a turned outer edge 25 which instead of being in the form of a rolled edge comprises a double thickness of metal. Then by utilizing the four corners of the blank from which the ring 20' is made, I provide the ring with four groups of identical cushioning fingers 26' extending along the rear side of the cover 20'. Each of these fingers is turned back upon itself at 27' into a slightly dished portion 28' terminating in the extremity 29'. It will be noted that the dished portion 28', when the trim ring is secured to the wheel, is adapted to engage around the nose portion 30' of the rim flange 31'.

In the application and use of this trim ring, the substantially same centering and cushioning occurs as was described in connection with fingers 26. In both forms of the invention the trim ring may be provided with apertures through which the valve stem 33 can extend, as shown in Figure 1, in the usual manner so as to make the valve stem accessible without requiring removal of the trim ring.

Attention is also directed to the fact that in both forms of the invention I do not utilize the spring cushioning fingers to clamp the trim ring to the wheel. They merely serve as centering and cushioning elements. It is true that they will frictionally hold the trim ring on the wheel during the time the hub cap is being applied. However, it is the hub cap that positively clamps the trim ring under tension to the wheel body.

An advantage of my construction is that it is possible to use in a satisfactory manner the hub cap for clamping the trim ring on the wheel without the trim ring in the use of the wheel tending to dislodge the hub cap. The reason for this is that the cushioning springs carry the trim ring on the wheel and thus relieve to a substantial extent any tension being imposed on the cap which would tend to dislodge the cap from its engagement with the retaining spring clips. In other words, should the wheel in use be suddenly jarred, the spring fingers will take up or cushion the jar which would not be true if the outer margin of the trim ring was tightly held on the rim part without any cushioning medium between the trim ring and the rim part.

I claim as my invention:

1. In a wheel structure including a wheel having a multi-flanged tire rim part including an intermediate flange with a nose juncture with a terminal flange and a body part with a hub cap in detachable cooperation therewith, an annular trim ring disposed between the body part and rim part having its outer margin turned back on itself to form a curled hollow outer edge, said curled edge being spaced from the rim part and, having extending therefrom rearwardly of the ring toward the wheel, a plurality of looped fingers each with an outer extremity facing the intermediate flange nose juncture of the rim part and a loop portion spaced axially inwardly from said extremity engaging the intermediate flange of the rim part to form a cushioned centering contact between the ring and the rim, the inner edge of the ring being clamped and secured against the body part by the hub cap.

2. In a wheel structure including a wheel having a multi-flanged tire rim part including an intermediate flange with a nose juncture with a terminal flange and a body part with a hub cap in detachable cooperation therewith, an annular trim ring disposed between the body part and rim part having its outer margin turned back on itself to form a turned hollow outer edge, said turned edge being spaced from the rim part and, having extending therefrom rearwardly of the ring toward the wheel, a plurality of looped fingers each with an outer extremity facing the intermediate flange nose juncture of the rim part and a loop portion spaced axially inwardly from said extremity engaging the intermediate flange of the rim part to form a cushioned centering contact between the ring and the rim, the inner edge of the ring being clamped and secured against the body part by the hub cap, said loop portions of the fingers having a yieldable, slidable contact with the intermediate flange of the rim part whereby the ring may be readily removed from the wheel after removal of the cap from the wheel.

3. In a wheel structure including a wheel having a multi-flanged tire rim part including an intermediate flange with a nose juncture with a terminal flange and a body part with a hub cap in detachable cooperation therewith, an annular trim ring disposed between the body part and rim part having its outer margin turned back on itself to form a turned hollow outer edge, said turned edge being spaced from the rim part and, having extending therefrom rearwardly of the ring toward the wheel, a plurality of looped fingers each with an outer extremity facing the intermediate flange nose juncture of the rim part and a loop portion spaced axially inwardly from said extremity engaging the intermediate flange of the rim part to form a cushioned centering contact between the ring and the rim, the inner edge of the ring being clamped and secured against the body part by the hub cap, said looped fingers being slightly compressible between the rim part and the back of the ring to tighten the engagement with the rim part when the inner edge of the ring is pressed in against the body part by the cap.

4. In a wheel structure including a wheel having a multi-flanged tire rim part including an intermediate flange with a nose juncture with a terminal flange and a body part with a hub cap in detachable cooperation therewith, an annular trim ring disposed between the body part and rim part having its outer margin turned back on itself to form a rolled hollow outer edge, said rolled edge being spaced from the rim part and, having extending therefrom rearwardly of the ring toward the wheel, a plurality of looped fingers each with an outer extremity facing the intermediate flange nose juncture of the rim part and a loop portion spaced axially inwardly from said extremity engaging the intermediate flange of the rim part to form a cushioned centering contact between the ring and the rim, the inner edge of the ring being clamped and secured against the body part by the hub cap, said ring being deeply dished axially inwardly from its outer edge to its inner edge so as to provide a relatively wide expanse of curved covering material over the flanges of the rim part.

5. In a wheel structure including a wheel body and a multi-flange tire rim including an intermediate flange and a terminal flange with a juncture shoulder between said flanges, a trim ring for concealing the adjacent portions of the wheel body and the tire rim and having a turned outer margin, said turned outer margin having extending generally axially inwardly therefrom behind the trim ring a plurality of retaining fingers each of which comprises a spring loop portion turned generally radially and axially outwardly and having a dished portion facing generally radially outwrdly, the extremity of the dished portion and the spring loop portion engaging the tire rim at spaced points on said shoulder and said intermediate flange and supporting the trim ring in cushioned frictionally detachable relation on the tire rim.

6. In a wheel structure including a wheel body and a multi-flange tire rim including an intermediate flange and a terminal flange with a juncture shoulder between said flanges, a trim ring for concealing the adjacent portions of the wheel body and the tire rim and having a turned outer margin, said turned outer margin having extending generally axially inwardly therefrom behind the trim ring a plurality of retaining fingers each of which comprises a spring loop portion turned generally radially and axially outwardly and having a dished portion facing generally radially outwardly, the extremity of the dished portion and the spring loop portion engaging the tire rim at spaced points on said shoulder and said intermediate flange and supporting the trim ring in cushioned frictionally detachable relation on the tire rim, the radially inner margin of the trim ring being disposed normally to lie in spaced relation to the wheel body, and a cover member attached to the wheel body and clamping the inner margin of the trim ring against the wheel body under tension stressing the cushioning fingers against the tire rim.

7. In a trim ring for disposition at the outer side of a vehicle wheel including a multi-flange tire rim having an intermediate flange and a terminal flange with a rounded nose juncture between the flanges, a trim ring body for disposition opposite the tire rim and the adjacent portion of the wheel body and having a cushioning spring finger structure on the outer margin thereof and disposed behind said margin, said finger structure including a portion extending generally axially rearwardly and joining a return bent loop portion extending generally radially outwardly and axially outwardly and terminating in a generally radially outwardly projecting tip with a dished generally radially outwardly facing area therebetween, said loop portion and said tip being adapted to engage respectively the intermediate flange and the nose portion of the tire rim with the dished intermediate area spaced from the tire rim.

8. In a trim ring for disposition at the outer side of a vehicle wheel including a multi-flange tire rim, a body portion, the outer margin of the body portion having retaining finger means disposed therebehind and including a finger member extending generally axially rearwardly and then turned generally radially outwardly and axially outwardly upon itself and with its extremity directed generally radially outwardly, the area of the finger intermediate the extremity and the axially innermost turned portion of the finger being dished so that the finger will engage the flange portions of the tire rim with said extremity and the axially innermost turned portion at spaced points with the extremity functioning to maintain the trim ring margin in spaced relation axially outwardly from the tire rim and the finger as a whole maintaining the trim ring in cushioned radially inwardly spaced relation to the tire rim.

GEORGE ALBERT LYON.

REFERENCES CITED

The following references are of record in the file of this patent:

UNITED STATES PATENTS

| Number | Name | Date |
| --- | --- | --- |
| 2,308,616 | Lyon I | Jan. 19, 1943 |
| 2,368,228 | Lyon II | Jan. 30, 1945 |
| 2,404,389 | Lyon III | July 23, 1946 |